United States Patent [19]

Perl

[11] Patent Number: 4,585,611
[45] Date of Patent: Apr. 29, 1986

[54] UNDERVESSEL ARRANGEMENT

[75] Inventor: Martin G. Perl, San Jose, Calif.

[73] Assignee: General Electric Company, San Jose, Calif.

[21] Appl. No.: 472,020

[22] Filed: Mar. 4, 1983

[51] Int. Cl.⁴ ............................................. G21C 19/00
[52] U.S. Cl. ..................................... 376/260; 187/24; 187/25
[58] Field of Search ................... 74/89.15; 187/24, 25; 376/232, 249, 268, 269, 270, 260, 280, 285

[56] References Cited

U.S. PATENT DOCUMENTS

| 221,037 | 10/1979 | Dawson | 187/24 |
|---|---|---|---|
| 3,567,579 | 3/1971 | Hubler et al. | 376/269 |
| 3,755,079 | 8/1973 | Weinstein et al. | 376/273 |
| 3,817,398 | 6/1974 | Jones | 187/25 |
| 4,292,133 | 9/1981 | Sasaki et al. | 376/260 |

FOREIGN PATENT DOCUMENTS 5749833 11/1982 Japan.

OTHER PUBLICATIONS

Chironis, Product Engineering, Apr. 2, 1962, vol. 33, No. 7, pp. 68-73.

Primary Examiner—Deborah L. Kyle
Assistant Examiner—Richard W. Wendtland
Attorney, Agent, or Firm—Ivor J. James, Jr.; Raymond G. Simkins

[57] ABSTRACT

A stabilizer and aligning support plate arrangement for a vertically and rotatably positionable undervessel platform in a nuclear reactor including a pressure vessel, said arrangement facilitating mobilization of said platform for servicing operation.

3 Claims, 15 Drawing Figures

UNDERVESSEL ARRANGEMENT

CROSS REFERENCE TO RELATED APPLICATION

Cross reference is made to a related, copending application entitle "Undervessel Arrangement," Ser. No. 472,094, now abandoned which was filed on even date with this application and assigned to the same assignee.

FIELD OF INVENTION

This invention relates to structures for lifting workers and equipment to suitable service levels in a work chamber, and more particularly relates to a vertically positionable and horizontally rotatable structure for maneuvering personnel and equipment in the undervessel region of a nuclear reactor.

BACKGROUND

Many types of nuclear reactors heat water in pressure vessels, for power production. General information in regard thereto is disclosed by D. M. Considine in *Energy Technology Handbook* (McGraw-Hill, 1977).

Below the pressure vessel in many reactors, there is a chamber in which reactor equipment is installed, replaced, and maintained, and other servicing operations are performed. In the undervessel region of the reactor, there are various reactor support structures, including a floor or basemat and a foundation. One or more tunnels extend through the walls of the foundation to permit the entry of personnel and of servicing vehicles travelling on rails.

The servicing vehicles travel onto a platform in the undervessel chamber. The platform, according to the prior art, is rotatable but fixed at a selected elevational level. This permits some servicing operations to be conducted by positioning the servicing tool vehicle directly under the part of the reactor vessel being serviced. Other servicing operations may be very difficult to perform, because the servicing would require the platform to be elevated to a specific level necessary for the work to be accomplished. Different levels may be required for servicing such diverse equipment as control rod drives, core power level monitors, and core circulation pumps.

OBJECT OF THE INVENTION

Accordingly, it is an object of the instant invention to provide, for operation in the undervessel region of a nuclear reactor, a servicing or undervessel platform which is variable in elevation.

The platform is to be stable during servicing operation and sound in structure without "wobbling" during movement.

The platform is to align and elevate precisely on its supporting structure without binding when it is lifted or lowered.

According to a mode of the invention in which the platform is to be elevated by a jack screw supported at its bottom end, the jack screw is to be protected from bowing.

Additionally, it is intended that the servicing platform be latchable into place at selected levels in the undervessel chamber, in order to provide additional servicing stability.

SUMMARY

These and other objects are fulfilled by the invention herein which provides a vertically positionable and latchable, horizontally rotatable servicing platform for operation in the undervessel region of a nuclear reactor. The platform supports wheeled servicing tool vehicles and equipment for servicing operations in the undervessel chamber. The platform is constructed with an upper level rotatably mounted on a platform support structure which can be elevated by a lift mechanism operating against guide columns in the undervessel region. In a preferred embodiment of the invention, extensions of the platform extend into the guide columns and are moved to selected elevations by jackscrews.

The platform extensions have rollers which travel within the guide columns. A single jackscrew cooperates with each platform extension for non-binding lifting action. Support plates accommodate lateral displacement between the extension and the jack screw. One of the support plates engages the underside of the platform extensions and threadingly engage the jackscrew. The plates do not rotate with the jackscrew. The jackscrew extends through variably dimensioned apertures in the plates. The lower plate is engaged with the jackscrew and is snugly or threadingly cooperative with the jackscrew; the aperture of the platform support plate permits some lateral slippage. This slippage permits lateral adjustment between the several plates. An intervening plate may engage both other plates including the upper and lower plates, permitting lateral adjustment to occur even more effectively.

Any risk of binding between the jackscrew and the guide column may be reduced or eliminated by a stabilizing mechanism spacing the jackscrew from the sides of the guide column. More specifically, the stabilizing mechanism includes a bar and spacer to prevent the jackscrew from bowing within the guide column. The stabilizing mechanism is collapsible and can telescope in several steps with the spacers acting at intervals within the guide column.

DRAWING OF A PREFERRED EMBODIMENT OR BEST MODE OF THE INVENTION

The invention is illustrated in the drawings attached, wherein.

DETAILED DESCRIPTION OF A PREFERRED EMBODIMENT

Figure 1:
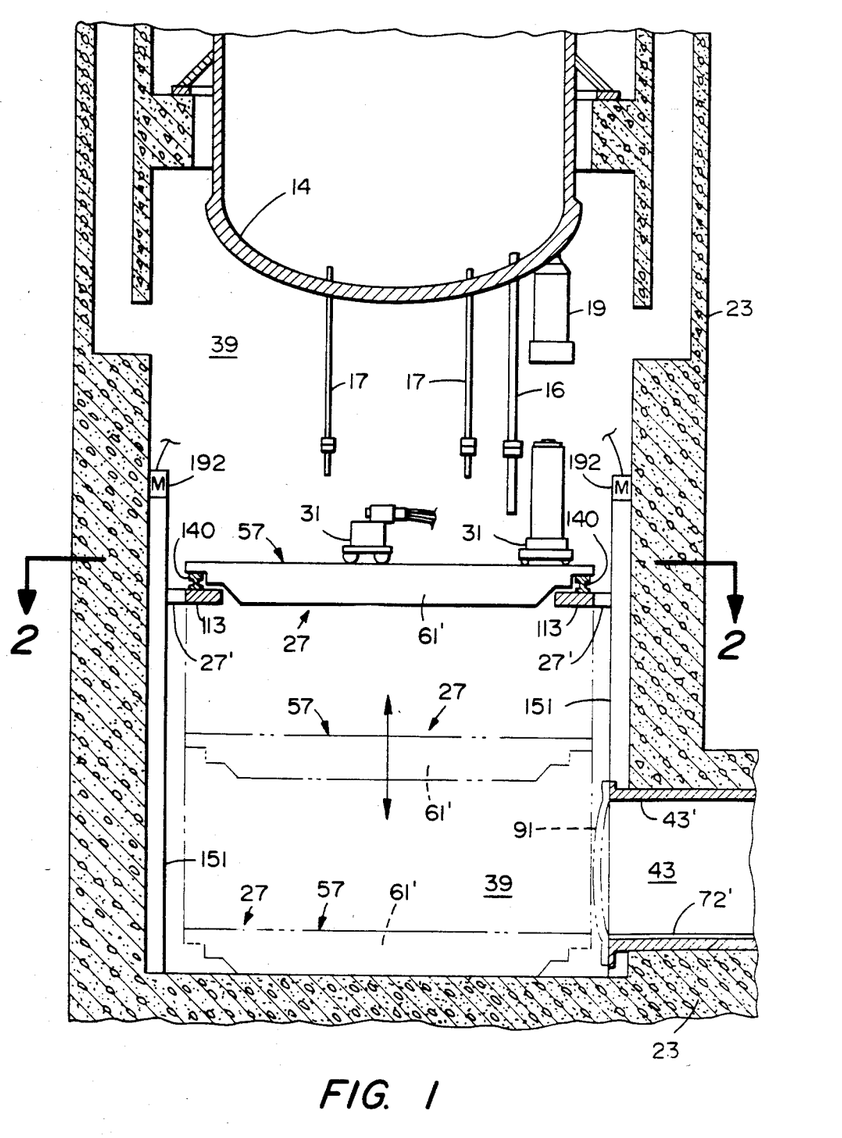
FIG. 1 shows the undervessel chamber of a nuclear reactor in vertical cross-section, including an underveseel region with a tunnel including rails for servicing vehicles, which extends through the foundation of the undervessel region.

FIG. 1 shows the underside of the pressure vessel 14 of a nuclear reactor. Extending through the pressure vessel 14 are control rod drives 16, power level monitors 17, and circulating pumps 19. A support structure including a foundation 23 carries the pressure vessel 14 and supports servicing platform 27 shown at several levels which can support men and equipment 31 to service the reactor. The equipment 31 includes servicing vehicles, which can enter the undervessel chamber 39 through a tunnel 43 including a steel liner 43' extending through the walls of the foundation 23.

Figure 2:
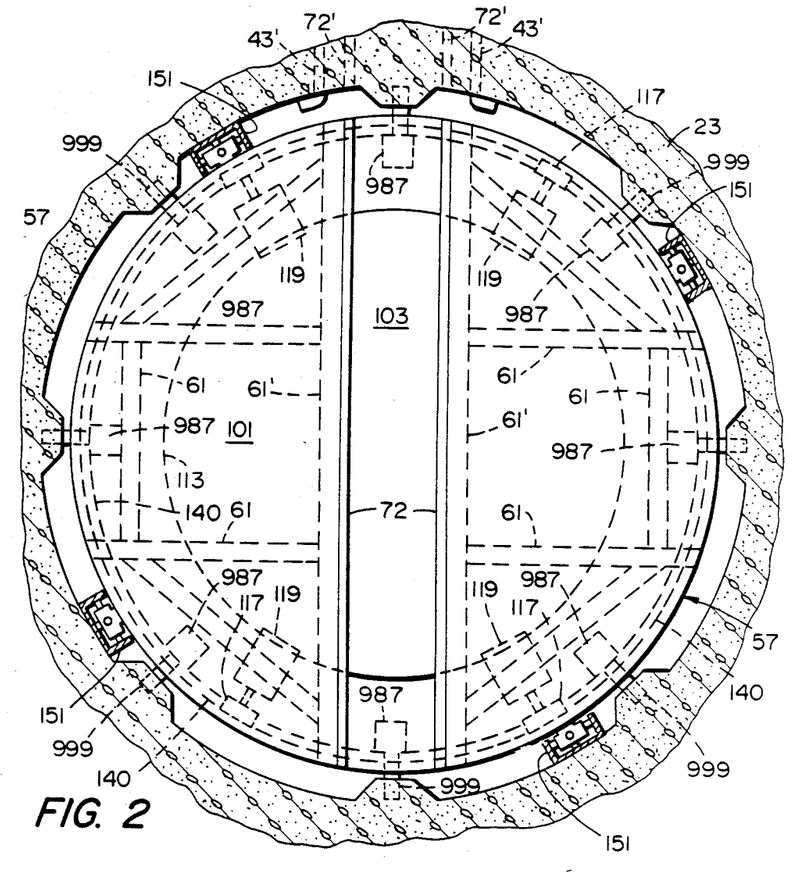
FIG. 2 is a horizontal cross-section of the undervessel chamber showing an upper level of the platform horizontally rotatable on a circular rail to position servicing tools by rotation.
Figure 3A:
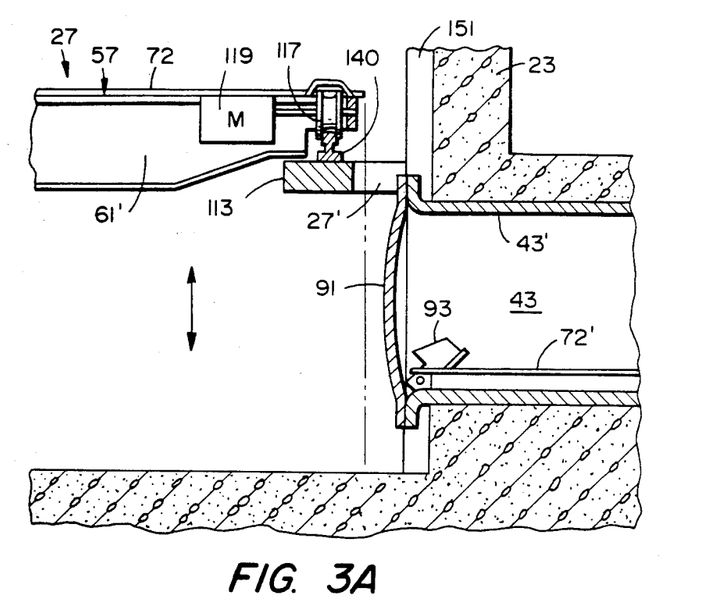
FIGS. 3A and 3B show the work platform vertically positioned, for example, at suitable working level (FIG. 3A); and at the floor level of the equipment tunnel to receive servicing equipment (FIG. 3B).

FIG. 2 shows an upper level or work area 57 of the servicing platform 27 constructed of suitable steel beams 61 and other structural parts known to one skilled in the art. In FIGS. 1 and 2, parallel rails 72 are shown mounted on particular beams 61' of the platform 27, which can be aligned with similar rails 72' in tunnel 43 for vehicle transfer incident to servicing operation. This entails among other things removing a door 91 of the tunnel 43 and swinging a hinged track section 93 into place, as suggested in FIGS. 3A and 3B respectively. A suitable grating 101 (FIG. 2) provides a walking surface for workers on the platform 27.

An aperture 103 between the parallel rails 72 permits servicing operations which extend below the upper level 57 of the platform 27, such as replacement of a control rod drive 16.

The upper level 57 of the platform 27 is horizontally rotatable on a support ring 113 as seen in FIG. 1 and FIG. 2. Wheels 117 driven by motors 119 effect the rotation of the upper level 57 on a circular rail 140. Alternatively, the circular rail 140 can be mounted on the underside of the platform upper level 57. The wheels 117 and motors 119 would of course then be mounted on the support ring 113.

Figure 8:
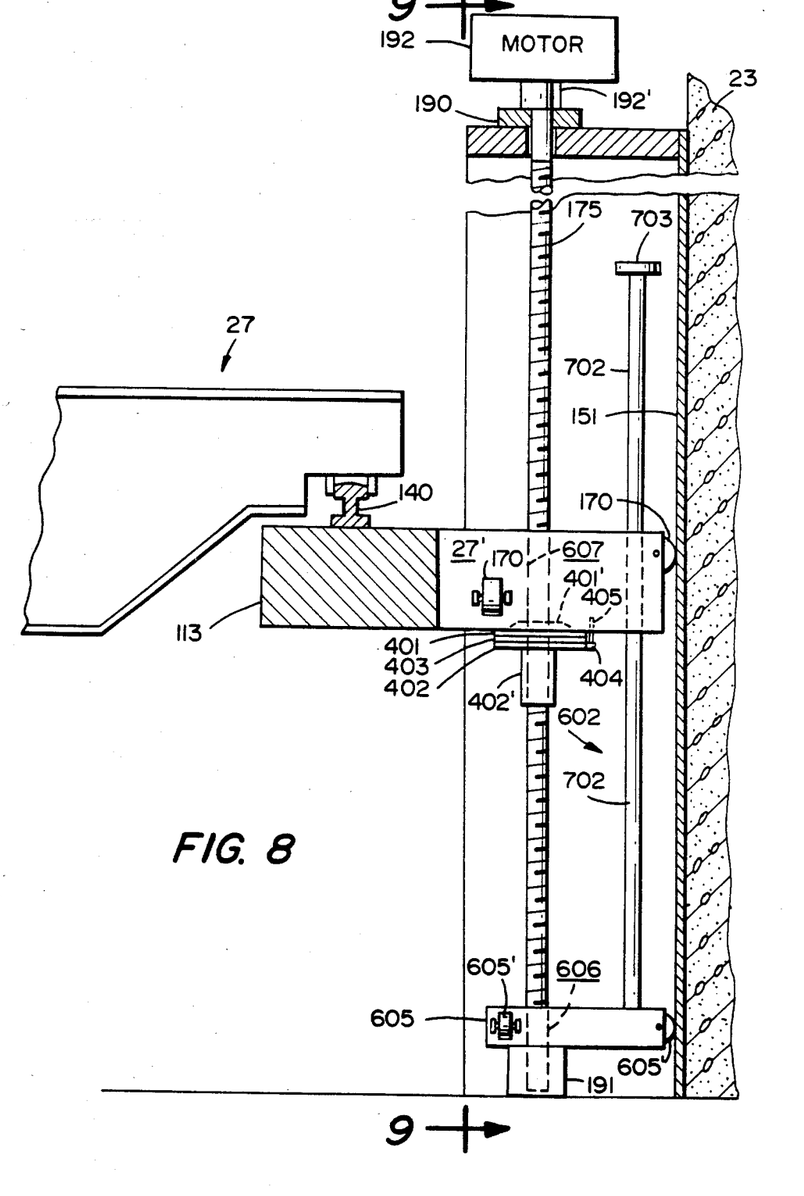
FIG. 8 shows a stabilizing mechanism to inhibit bowing and binding of the jackscrew in its guide column.

The lift mechanisms shown in FIGS. 4A–4D operate within U-shaped guide columns 151 supported on the foundation 23 or on support pillars (not shown) spaced away from the sides of foundation 23. Each guide column 151 receives an extension or extension portion 27' extending radially from the support ring 113 of the platform 27. Each extension 27' includes rollers 170 to engage the guide column, as shown in FIG. 5. One kind of lift mechanism is a jackscrew 175 which can be mounted within the guide column 151 by a suitable combination of thrust and guide bearings, respectively 190 and 191 as shown in FIG. 8. The jackscrew 175 is driven by a motor 192 acting through a coupling 192' in synchronism with other such motors and jackscrews (not shown) to lift the entire platform 27 evenly. In the alternative, a single motor 192 could drive all the jackscrews 175 through suitable gears and couplings (not shown). The motor 192 could be either at the top or at the bottom end of the jackscrew.

Figure 4A:
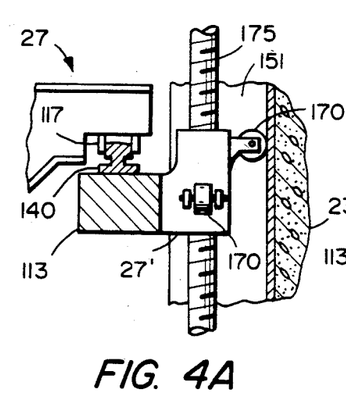
FIGS. 4A through 4D show various mechanisms for raising and lowering the servicing platform, including a jackscrew, cable, bar, or chain drive.
Figure 4B:
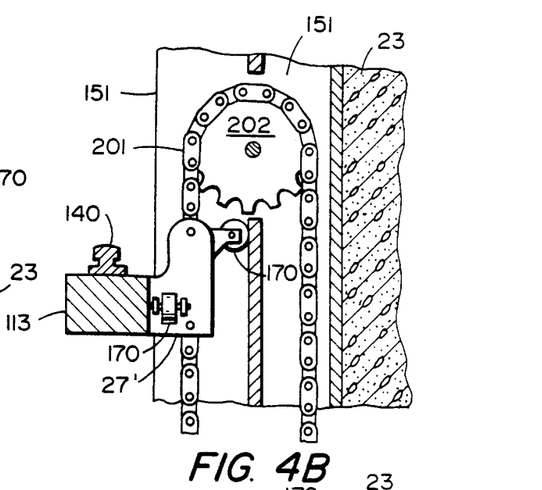
Figure 4C:
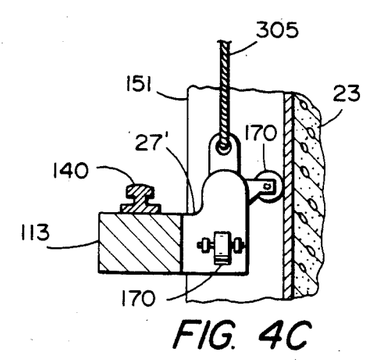
Figure 4D:
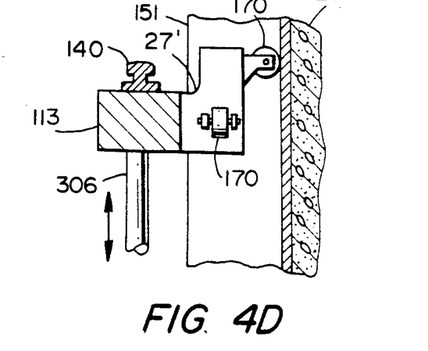
Figure 5:
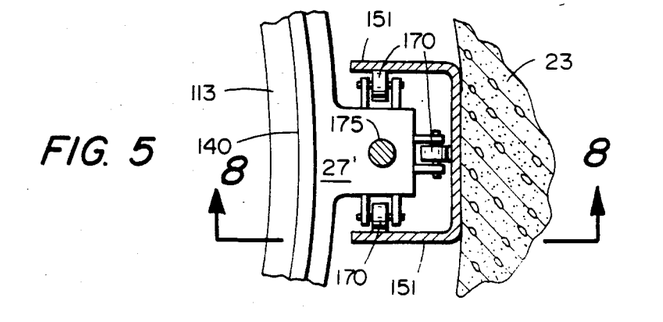
FIG. 5 details an extension portion of the platform, which is translated by one of the lift mechanisms of FIGS. 4A–4D.

FIGS. 4B, 4C and 4D show alternative kinds of lift mechanisms, and specifically FIG. 4B shows a chain drive 201 and gear 202 mounted in the guide column 151 for lifting the platform 27 with extensions 27'. Similarly, FIG. 4C shows a cable drive 305 effective for lifting platform 27. Finally, in FIG. 4D, the extension 27' rises and falls under the influence of a bar drive 306, which may be hydraulically driven.

Figures 6, 7:
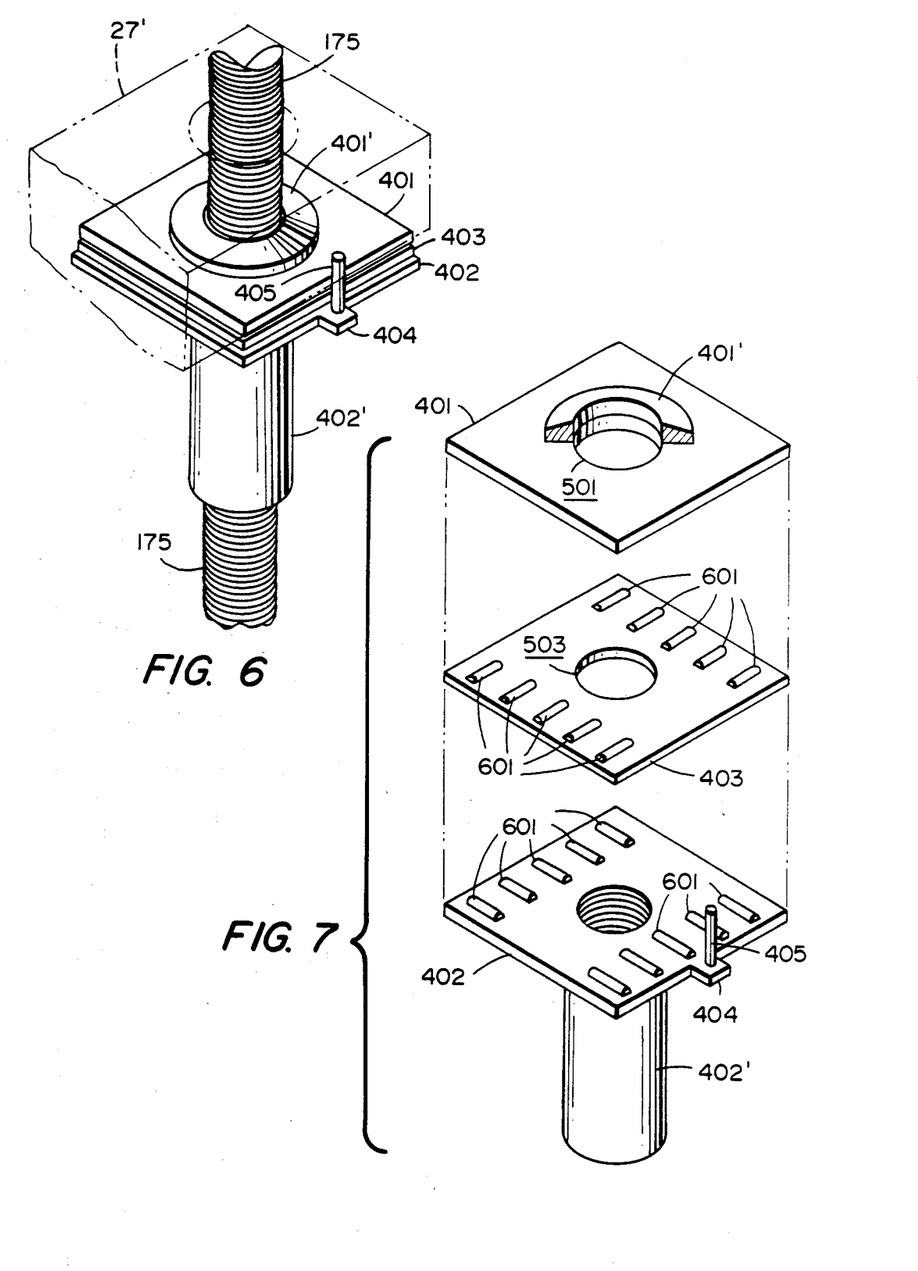
FIG. 6 shows a portion of the jackscrew of FIG. 4A carrying support plates for lifting the service platform.
FIG. 7 is an exploded view of the support plates of FIG. 6.

FIG. 6 shows upper, lower, and middle plates respectively at 401, 402, and 403 for supporting platform extension 27' on jackscrew 175. Upper plate 401 defines a raised portion 401' fitting a complimentary depression in the underside of platform extension 27', thereby supporting the platform 27 itself. Lower plate 402 includes an internally threaded collar 402' for cooperating with the threads of jackscrew 175. Tab 404 extends outwardly from lower plate 402, and finger 405 extends upwardly from tab 404 into a hole in the underside of extension 27' to thus prevent plates 401–403 from rotating with jackscrew 175. Therefore, the rotation of jackscrew 175 is effective for vertically displacing plates 401–403 and the platform 27 which they support. As seen in FIG. 7, plates 401 and 403 define respective apertures 501 and 503 which are larger than the outer diameter of jackscrew 175. This permits the lateral displacement of plates 401 and 403 relative to plate 402 and to each other. The middle plate 403 is needed when roller bearings are utilized and is useful if sliding bearing surfaces or ball bearings are utilized. Sliding between plates 401, 402, and 403 may be encouraged by a suitable lubricant.

Plates 402 and 403 are shown in FIG. 7 as including roller-shaped bearings mounted in suitable recesses in the top surfaces thereof. The bearings 601 in plate 402 are orthogonal to the bearings 601 in plate 403 to facilitate lateral repositioning therebetween.

Figure 9A:
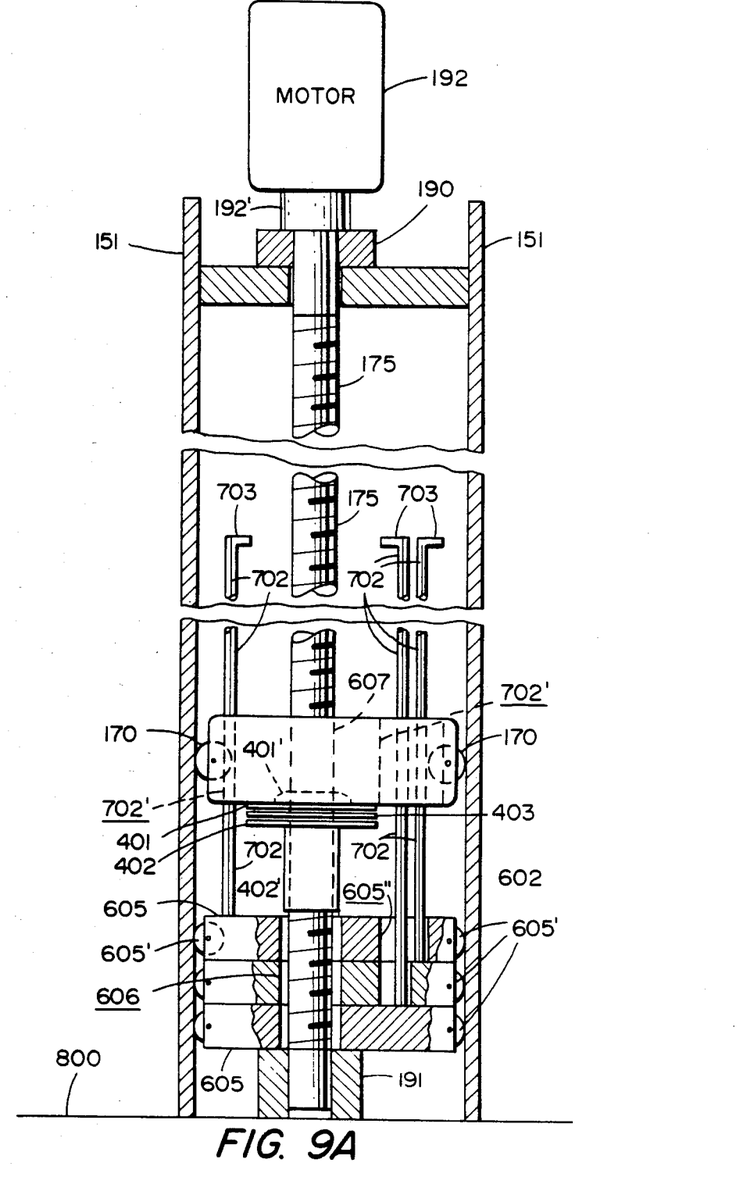
FIGS. 9A and 9B show a version of the stabilizing mechanism having several stages, respectively at complete collapse and at full extension.
Figure 9B:
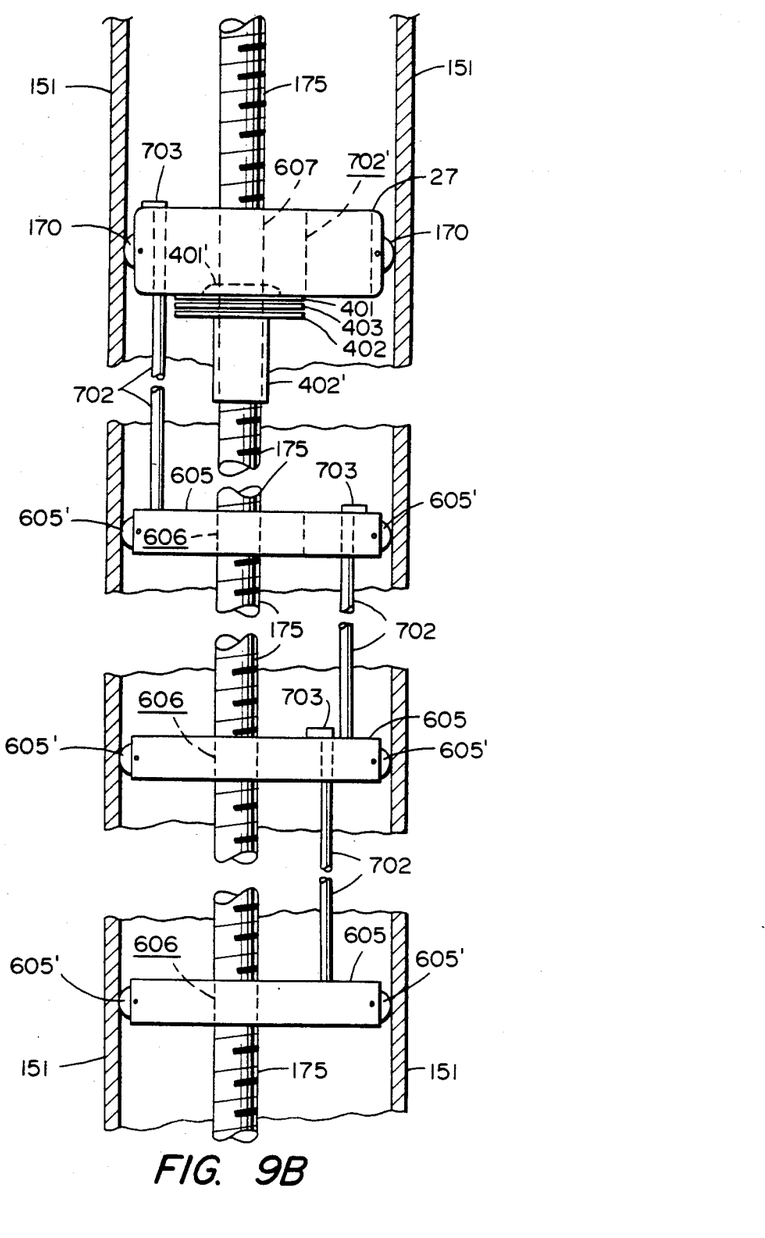

A stabilizer arrangement 602 for the jack screw 175 is shown in FIGS. 8 and 9A–B. The arrangement in FIG. 8 includes a rod 702 extending through an aperture 702' in extension 27'. At its upper end the rod 702 defines a head 703. In FIGS. 9A and B, the stabilizer arrangement 602 is in several stages, the uppermost stage of which hangs (in B) from extension 27' on head 703. Secured to the lower end of rod 702, in each case, is a spacer 605 formed with an aperture 606 for slidingly fitting over the jack screw 175. Each spacer 605 is fitted with rollers 605' which bear against the guide column 151. Thus, the stabilizer arrangement 602 aids in preventing the jackscrew 175 from bowing and the resulting binding that would thereby occur between extension 27' and the jackscrew 175.

As the platform 27 approaches its lowered position, the spacer 605 touches bottom and the rod 702 slips through aperture 702', permitting the platform to continue further downward until it too touches bottom. FIG. 9A shows several stages of spacers 605 collapsed upon one another. The collapsed state is accommodated by widened apertures 702" and 605" respectively in extension 27' and spacer 605.

When the platform 27 is moved toward a selected upper level, the head 703 of rod 702 eventually engages the extension 27' and thereafter the rod 702 and the attached spacer 605 are carried upward with the platform 27. This condition is explicitly shown in FIG. 9B for the multistage version of the stabilizer arrangement 602. There, the uppermost stage hangs onto extension 27' by head 703 and each successive stage hangs similarly from the spacer 605 immediately above.

Figure 3B:
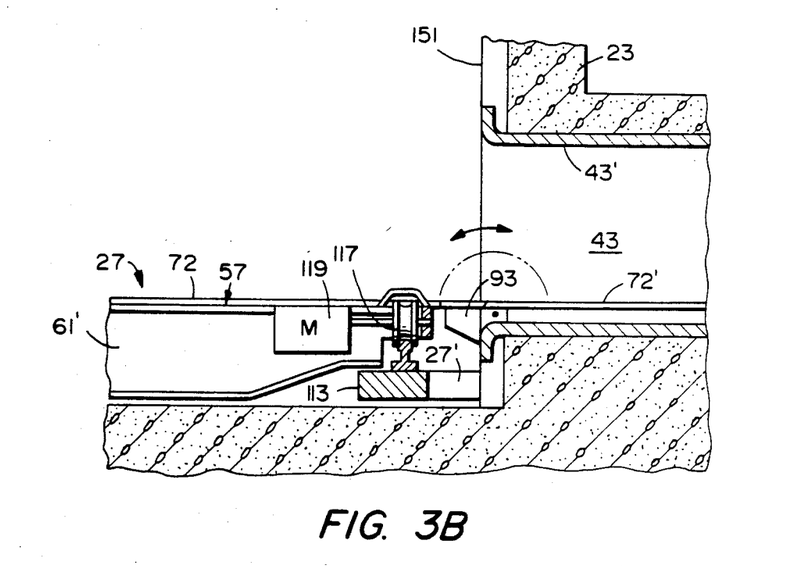
Figure 3C:
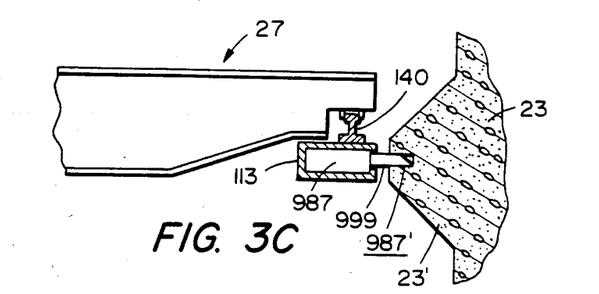
FIG. 3C shows how to latch the service platform into place at a selected elevation.

With the hinged rail section 93 laid in place between the platform on the basemat level as shown in FIG. 3B, servicing vehicles 31 can pass through tunnel 43 and trundle onto platform 27. The platform 27 can then be raised to a suitable operating level with stabilizer arrangements 602 preventing bowing of the jackscrews 175 and wobble in platform movement. When the platform 27 arrives at its selected operating level as indicated at FIG. 3C, latches 987 are engaged with apertures 987' in the wall of foundation 23. In each case according to the preferred embodiment herein, the latch 987 in question extends a bolt 999 into its receiving aperture 987'. Alternatively, the latches 987 could be mounted in the wall of the foundation 23, and the apertures in support ring 113.

The foregoing description is susceptible of reasonable modification that may occur to those skilled in the art. However, this invention is not meant to be limited to the embodiment shown and described. The claims set forth the inventive concepts and are intended to cover all modifications coming within the spirit and scope of the invention described herein.

I claim:

1. In a nuclear reactor system including a pressure vessel and an undervessel support structured, a servicing arrangement located below said pressure vessel comprising; an undervessel servicing platform having at least two lateral extensions; at least two guide columns for receiving said lateral extensions of said servicing platform, said guide columns limiting the radial movement of said lateral extensions; a jackscrew in each of said guide columns, each penetrating an aperture in the lateral extension therein; a plurality of apertured plates fitted on each said jackscrew for engaging and supporting the lateral extension penetrated by the jackscrew including an upper plate formed with a raised portion surrounding the aperture therein and engaging a complementary depression in the underside of the extension, a lower plate formed with an internally threaded collar engaging the threads of said jackscrew and means for preventing rotation of said upper and lower plates with said jackscrew, the aperture in said upper plate being greater in diameter than the diameter of said jackscrew for allowing limited lateral movement between said upper and lower plates; means for synchronously rotating each of said jackscrews for raising and lowering said servicing platform; and a stabliizer mechanism for each jackscrew for restraining said jackscrew from bowing including a rod positioned parallel to said jackscrew and penetrating with sliding fit an aperture in said lateral extension; a stabilizer spacer secured to the lower end of said rod and having an aperture penetrated with sliding fit by said jackscrew, rollers mounted on said spacer engaging the guide column within which said jackscrew is located, and a head on the upper end of said rod for engaging said lateral extension when said servicing platform is raised a predetermined distance whereby said rod and said stabilizer spacer secured thereto are moved upward as said servicing platform is raised beyond said predetermined distance.

2. The servicing arrangement of claim 1 including a middle plate containing rotating bearings between said upper and lower plates for facilitating said lateral movement.

3. The servicing arrangement of claim 1 including a second stabilizer mechanism located below the aforesaid stabilizer mechanism and having its headed rod penetrating an aperture in the aforesaid stabilizer spacer.

* * * * *